(12) United States Patent
Zacher et al.

(10) Patent No.: US 9,600,582 B2
(45) Date of Patent: Mar. 21, 2017

(54) BLOCKING OBJECTIONABLE CONTENT IN SERVICE PROVIDER STORAGE SYSTEMS

(71) Applicant: Microsoft Corporation, Redmond, WA (US)

(72) Inventors: Ryan Zacher, Woodinville, WA (US); Jorge Pozas Trevino, Seattle, WA (US); Christopher Wolf, Redmond, WA (US); Gary Anderson, Woodinville, WA (US); Jeff Ferreira, Bothell, WA (US); Mark Kramer, Snoqualmie, WA (US); Kathleen Ewing, Redmond, WA (US); Anthony Charles DiCola, Kirkland, WA (US); Emmanuel Miranda-Steiner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/901,545

(22) Filed: May 23, 2013

(65) Prior Publication Data

US 2014/0351957 A1 Nov. 27, 2014

(51) Int. Cl.
*G06F 17/30* (2006.01)
*H04L 29/06* (2006.01)
*G06F 21/55* (2013.01)

(52) U.S. Cl.
CPC ...... *G06F 17/30867* (2013.01); *G06F 21/554* (2013.01); *H04L 63/0245* (2013.01)

(58) Field of Classification Search
CPC ..... G06F 17/30; G06F 17/30867; H04L 63/10

USPC .......................................................... 726/29
See application file for complete search history.

(56) References Cited

U.S. PATENT DOCUMENTS

| 6,684,254 B1 | 1/2004 | Dutta |
| 7,020,774 B1 | 3/2006 | Cornuejols et al. |
| 7,536,386 B2 | 5/2009 | Samji et al. |
| 7,580,933 B2 | 8/2009 | Johnson et al. |

(Continued)

FOREIGN PATENT DOCUMENTS

WO 2010031413 A1 3/2010

OTHER PUBLICATIONS

"Content Blocking", Retrieved at <<http://help.opera.com/Mac/11.60/en/contentblock.html>>, Retrieved Date: Jan. 15, 2013, pp. 2.

(Continued)

*Primary Examiner* — Harunur Rashid

(57) ABSTRACT

When objects are shared by one user with another user, objectionable content, if identified as such, can be blocked from being shared, while the remainder of the shared objects can be accessed by the other user. Functions that allow sharing of content are implemented so as prevent sharing of objectionable content with another user, while allowing other content to be shared. If a group of files or objects is shared, then the presence of objectionable content in one object in the group results in that objectionable content not being shared, but the remaining files or objects are still shared. A graphical user interface for accessing the storage system, whether by providers or recipients of shared content, can selectively render information about objects with objectionable content.

18 Claims, 6 Drawing Sheets

(56) References Cited

U.S. PATENT DOCUMENTS

| | | | |
|---|---|---|---|
| 7,627,652 | B1 | 12/2009 | Commons et al. |
| 7,653,733 | B2 | 1/2010 | Beyda |
| 7,783,665 | B1 | 8/2010 | Tormasov et al. |
| 7,979,369 | B2* | 7/2011 | Grenier et al. ............... 706/20 |
| 7,991,957 | B2 | 8/2011 | Mercer |
| 8,117,226 | B2 | 2/2012 | Samji et al. |
| 8,312,485 | B2 | 11/2012 | Robson et al. |
| 8,380,632 | B2* | 2/2013 | Dicke et al. ............... 705/59 |
| 8,434,126 | B1* | 4/2013 | Schepis et al. ............... 726/1 |
| 8,504,653 | B1* | 8/2013 | Commons et al. ............ 709/219 |
| 8,769,300 | B2 | 7/2014 | Catrein et al. |
| 9,049,176 | B2 | 6/2015 | Ferdowsi et al. |
| 9,288,283 | B2 | 3/2016 | Alten |
| 9,294,485 | B2 | 3/2016 | Allain et al. |
| 9,325,571 | B2 | 4/2016 | Chen |
| 2001/0041989 | A1 | 11/2001 | Vilcauskas, Jr. et al. |
| 2003/0126267 | A1* | 7/2003 | Gutta et al. ............... 709/229 |
| 2005/0021780 | A1 | 1/2005 | Beyda |
| 2005/0132220 | A1 | 6/2005 | Chang et al. |
| 2005/0183143 | A1* | 8/2005 | Anderholm ............ G06F 11/32 726/22 |
| 2005/0198031 | A1* | 9/2005 | Pezaris et al. ............... 707/9 |
| 2008/0052514 | A1 | 2/2008 | Nakae |
| 2008/0104393 | A1 | 5/2008 | Glasser et al. |
| 2008/0133445 | A1* | 6/2008 | Pennington ............... 707/1 |
| 2008/0168490 | A1 | 7/2008 | Yu |
| 2009/0012965 | A1* | 1/2009 | Franken ............ G06Q 10/10 |
| 2009/0055915 | A1 | 2/2009 | Piliouras |
| 2009/0138808 | A1 | 5/2009 | Moromisato et al. |
| 2010/0037324 | A1* | 2/2010 | Grant ............... G06F 21/554 726/27 |
| 2010/0146269 | A1 | 6/2010 | Baskaran |
| 2011/0078197 | A1 | 3/2011 | Zurko et al. |
| 2011/0149809 | A1 | 6/2011 | Narayanaswamy |
| 2012/0005159 | A1 | 1/2012 | Wang et al. |
| 2012/0157049 | A1* | 6/2012 | Eliovits ............ H04L 63/10 455/411 |
| 2012/0221627 | A1* | 8/2012 | Sainio et al. ............... 709/203 |
| 2012/0246732 | A1* | 9/2012 | Burton ............... 726/26 |
| 2012/0254304 | A1* | 10/2012 | Anbalagan et al. ......... 709/204 |
| 2012/0311039 | A1* | 12/2012 | Ogawa ............... 709/204 |
| 2013/0031643 | A1* | 1/2013 | Rogel et al. ............... 726/29 |
| 2013/0047260 | A1* | 2/2013 | Hoefel et al. ............... 726/27 |
| 2013/0054477 | A1 | 2/2013 | Steele |
| 2013/0081141 | A1 | 3/2013 | Anurag |
| 2013/0117131 | A1* | 5/2013 | Robinson et al. ......... 705/14.72 |
| 2013/0117190 | A1 | 5/2013 | Wald |
| 2013/0275398 | A1 | 10/2013 | Dorman et al. |
| 2014/0143542 | A1 | 5/2014 | Chang |
| 2014/0149461 | A1 | 5/2014 | Wijayaratne et al. |
| 2014/0230018 | A1* | 8/2014 | Anantharaman ... H04L 63/0861 726/4 |
| 2014/0351541 | A1 | 11/2014 | Angelo et al. |
| 2014/0351957 | A1 | 11/2014 | Zacher et al. |

OTHER PUBLICATIONS

"Flickr Safety Guide", Retrieved at <<http://info.yahoo.com/safely/us/yahoo/flickr/>>, Retrieved Date: Jan. 15, 2013, pp. 4.

"How to Report Things", Retrieved at <<http://www.facebook.com/help/181495968648557/>>, Retrieved Date: Jan. 15, 2013, pp. 5.

"Watch What you Store on SkyDrive—You may Lose your Microsoft Life", Retrieved at <<http://wmpoweruser.com/watch-what-you-store-on-skydriveyou-may-lose-your-microsoft-life/>>, Retrieved Date: Jan. 15, 2013, pp. 9.

"Non-Final Office Action Received for U.S. Appl. No. 13/901,559", Mailed Date: Jul. 17, 2015, 10 Pages.

"Non-Final Office Action Received for U.S. Appl. No. 14/082,044", Mailed Date: Jul. 2, 2015, 28 pages.

Jujjuri, et al., "VirtFS—A Virtualization Aware File System Pass-through", In Proceedings of the Ottawa Linux Symposium, Jul. 2010, 14 Pages.

"International Search Report & Written Opinion Received for PCT Patent Application No. PCT/US2013/058362", Mailed Date: Jan. 30, 2014, 9 Pages.

Shami, et al., "Browse and Discover: Social File Sharing in the Enterprise", In Proceedings of the ACM Conference on Computer Supported Cooperative Work, Mar. 19, 2011, pp. 295-304.

Suhendra, Vivy, "A Survey on Access Control Deployment", In Security Technology, Dec. 8, 2011, pp. 11-20.

Yu, et al., "Achieving Secure, Scalable, and Fine-grained Data Access Control in Cloud Computing", In Proceedings of the 29th Conference on Information Communications, Mar. 14, 2010, 9 Pages.

"Autonomy's Virage Automates Copyright Infringement Detection for Online Video", Retrieved From <<https://web.archive.org/web/20070711195236/http://autonomy.com/content/News/Releases/2007/0405a.en.html>>, Apr. 5, 2007, 2 Pages.

"CyberScan (Online IP Infringement Detection Service)", Retrieved From <<http://www.hcltech.com/sites/default/files/CyberScan.pdf>>, White Paper of HCL, Jul. 2011, 17 Pages.

"Final Office Action Issued in U.S. Appl. No. 13/901,559", Mailed Date : Jan. 26, 2016, 10 Pages.

"Final Office Action Issued in U.S. Appl. No. 14/082,044", Mailed Date : Dec. 9, 2015, 34 Pages.

Agrawal, Swati, "Detecting Copyright Infringement on You Tube Videos using You Tube Metadata", In Department of Computer Science and Engineering, MTech Theses, Apr. 2, 2013, 46 Pages.

"Office Action Issued in U.S. Appl. No. 14/082,044", Mailed Date : Jul. 13, 2016.

"Non Final Office Action Issued in U.S. Appl. No. 13/901,559", Mailed Date: Aug. 12, 2016, 9 Pages.

\* cited by examiner

BLOCKING OBJECTIONABLE CONTENT IN SERVICE PROVIDER STORAGE SYSTEMS

BACKGROUND

Computer users increasingly share data through storage systems hosted by service providers on computer networks such as the internet. Service providers, however, are wary that users may share content that is objectionable. There are a variety of ways in which service providers can detect objectionable content. However, even if such content can be identified, the question that remains is what to do about it.

SUMMARY

This Summary introduces selected concepts in simplified form that are further described below in the Detailed Description. This Summary is intended neither to identify key or essential features of the claimed subject matter, nor to limit the scope of the claimed subject matter.

When objects are shared by one user with another user, objectionable content, if identified as such, can be blocked from being shared, while the remainder of the shared objects can be accessed by the other user. In one example implementation, metadata for each data file can include a restriction flag indicating whether the file has been marked as containing objectionable content. Functions that allow sharing of content are implemented so as prevent sharing of objectionable content with another user, while allowing other content to be shared. If a group of files or objects is shared, then the presence of objectionable content in one object in the group results in that objectionable content not being shared, but the remaining files or objects are still shared. A graphical user interface for accessing the storage system, whether by providers or recipients of shared content, can selectively render information about objects with objectionable content. For example, the interface can indicate the presence of an object, but access to objectionable content in that object can remain limited. In one implementation, the interface can present information indicating that access to the object is blocked due to objectionable content.

In an implementation in a file system, other file system operations can be implemented to allow access to parts of the file or data about the file, but the objectionable content is not made available. For example, in one implementation a file includes multiple file streams, including at least a metadata stream and a data stream. If a file contains objectionable content in the data stream, then access to the data stream is prevented; however, access to the metadata stream can be enabled. Metadata that is derivative of the objectionable content also can be removed, not generated or made not accessible. For example, for image files, a reduced image, representative of the image in the file, can be either removed, not generated, or made not accessible. Because the file is stored in a shared storage system, what data is made available about the file, and how it is stored, can also be function of both the restriction flag and the identity or role of the user accessing it, using access control information for the file.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a shared storage system can be implemented. This example is provided in the context of an online, shared file system for multiple users to access over a computer network. Other implementations of a shared storage service also can be used.

Figure 1:
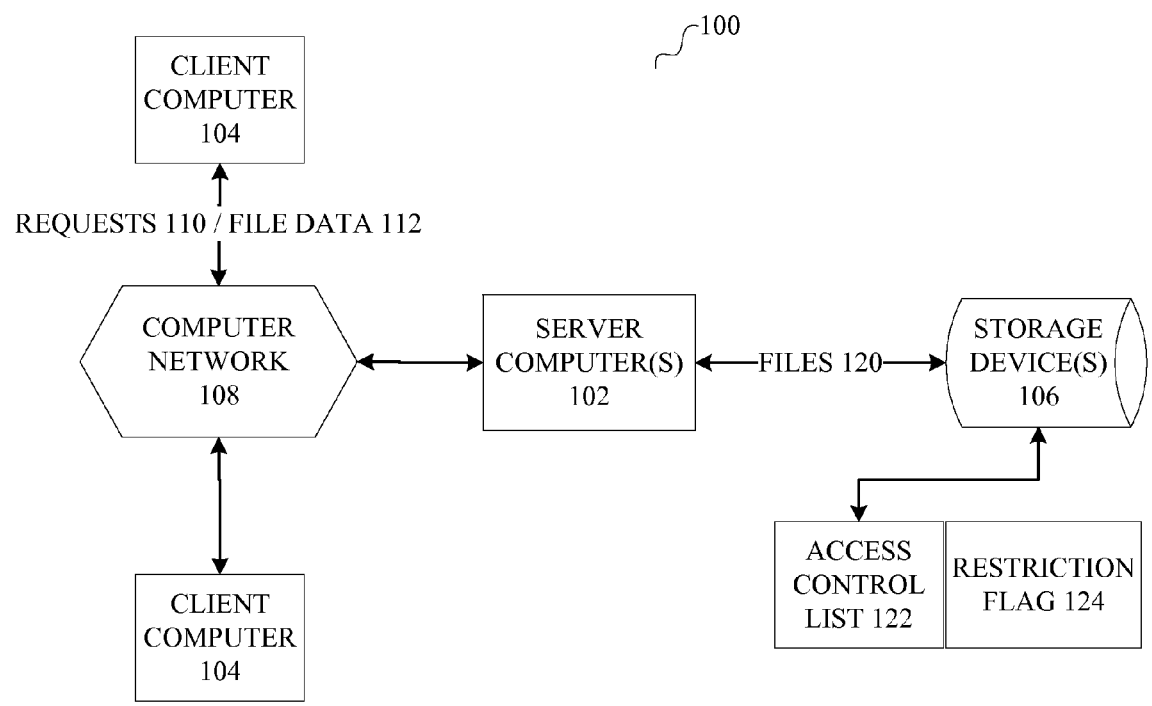
FIG. 1 is a block diagram of an example shared storage system from a service provider.

Referring to FIG. 1, a shared storage system 100 includes one or more server computers 102 on which the storage system is hosted by a service provider. Files 120 are stored on one or more storage devices 106 that are accessed by the server computers 102. Users access files stored on the shared storage system through client computers 104 that connect to the server computer 102 over a computer network 108. In one implementation, the shared storage system in an online, networked storage system, such as a storage service provided to end users over the Internet. Each of the server computers and client computers can be implemented using a computing device such as described below in connection with FIG. 6.

The client computer 104 typically includes a browser application that communicates with the server computers 102 using a conventional communication protocol. Typically, the server computer 102 prompts the user for authentication information to access an account. After receiving the authentication information, the server computer presents a user with information relating to their account, such as files and folder containing files that the user has stored on the shared storage system. Other operations also can be made available, such as uploading, deleting, modifying and downloading files and folders, defining collections of files, sharing files and collections of files with other users, accessing files and collections of files shared by other users, and searching for files and folders. In general, a client computer 104 sends requests 110 for information to the server computers 102, in response to which the server computers provide file data 112 to the client computer 104, where the file data 112 can be metadata about a file or contents of a file.

A file 120 has information stored about it that the server computers 102 use to manage access to the file by various users. Each file 120 has, in particular, an access control list 122 and a restriction flag 124. The access control list 122 indicates which users are permitted to access a file, and the nature of those permissions. As described in more detail below, the restriction flag 124 indicates whether the file is determined to have objectionable content. Such a determination can be obtained, for example, by users that report abuse in a system, or through automatic processing. A file can include one or more independently accessible portions, or file streams, which contain different information. In particular a file can include content and metadata about that content in separately accessible portions of the file. The access control list can differentiate access for users at the file stream level in addition to the file level. The access control list also can distinguish between an "owner" of a file system object and others. In one implementation, the system can limit access to objectionable content by others, while allowing full access to the owner of a file system, regardless of whether the file system object is marked as having objectionable content.

Given this context, an example implementation will be described in more detail in connection with FIGS. 2-5.

Figure 2:
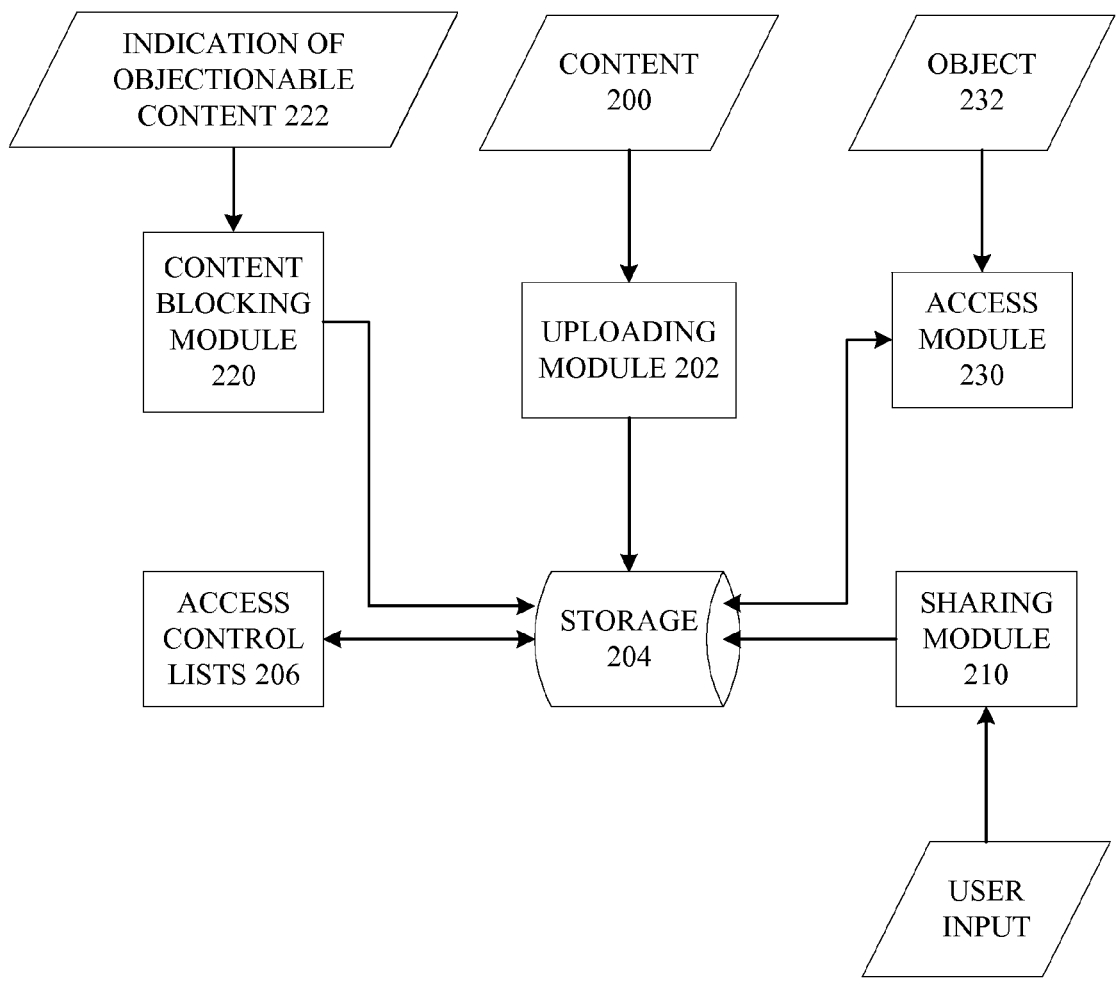
FIG. 2 is a data flow diagram illustrating an example implementation of access restrictions

FIG. 2 illustrates a data flow diagram of a system in which content can be shared by one user with another user through a shared storage system such as shown in FIG. 1. Content 200 is handled by an uploading module 202 and then stored in storage 204. Through the uploading module, a user can identify content to be uploaded, and navigate to a storage folder on the shared storage system in which to store the uploaded content. The uploading module causes the uploaded content to be stored. Access control lists 206 are created that associate the content with this user and otherwise specify permissions for various entities that can access this content.

For a user to share information, a sharing module 210 is accessed. In response to user input 212, one or more items of stored content are identified by the user. Also though the sharing module, through user input 212, a user can identify one or more other users with whom the selected content is to be shared. The sharing module 210 creates a collection of the selected content, and indicates on the access control list for the collection that the other identified users are authorized to access this content. A user can be an individual, a device, a system process, an application or other entity that can access content through the storage system. There are a variety of ways in which a user can specify such a collection, the users with whom it is to be shared, and the permissions to be given to those users, the foregoing merely being one example.

A content blocking module 220 can receive indications 222 of content to be blocked due to objectionable content. For example, such information can be reported by other users and/or detected automatically. The access control list for that content is updated to indicate that there is objectionable content to be blocked when shared.

Through an access module 230, other users can access content in collections to which they have been given authorization. Given an indication 232 of an object, such as a file, to be accessed, the access module determines whether the user is authorized to access the selected content, and determines if the content is blocked, by using the access control list. If the user is authorized to access the content, the content is provided to the user. In the event that the user is authorized, but the content is blocked, a graphical user interface of the access module can indicate to the user that the content is present but access to the content is blocked.

Figure 3:
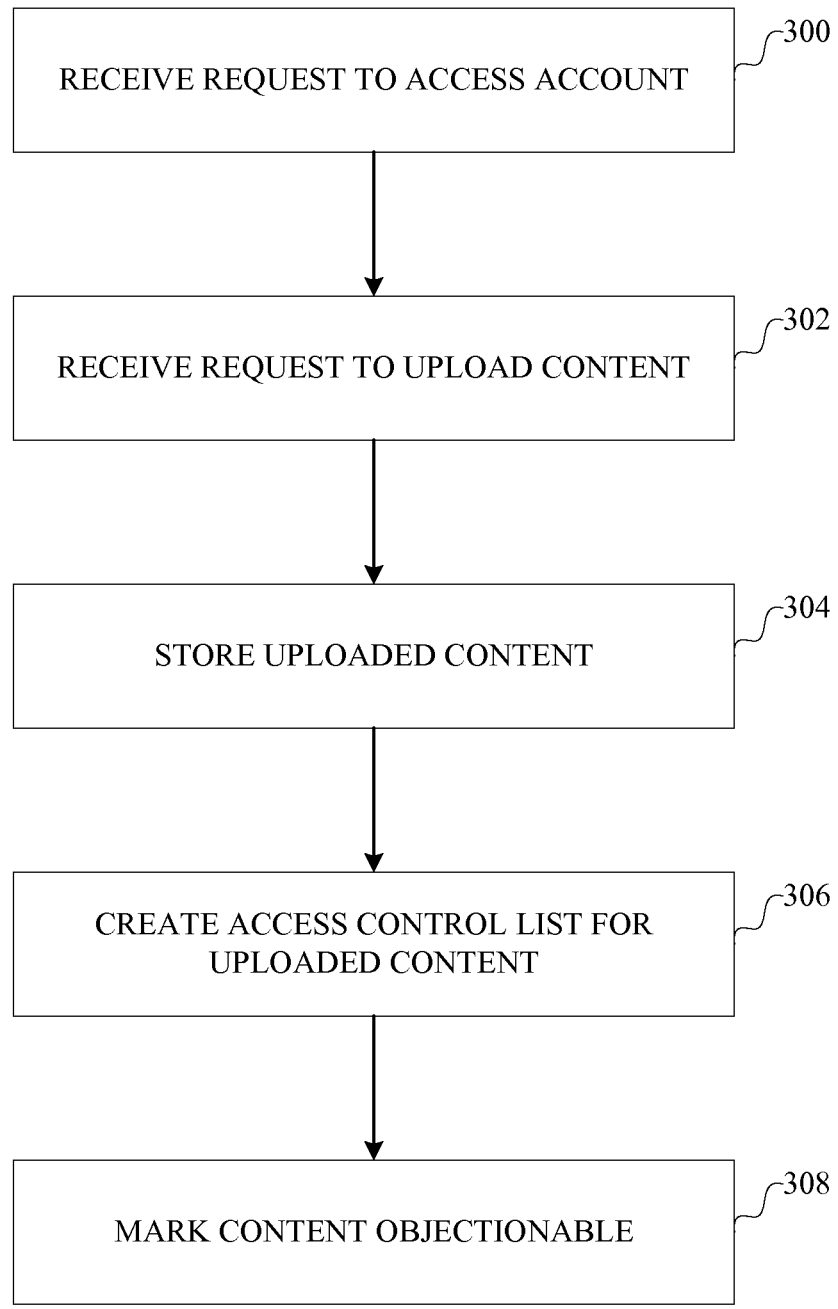
FIG. 3 is a flow chart an example implementation of uploading content to the storage system.

FIG. 3 is a flowchart describing an example implementation of operation of such a system when uploading content.

A system receives 300 a request from a user to access his or her account. After allowing access, the system can receive 302 a request from the user to upload content to the storage. The system receives, processes and stores 304 the content in the storage system, including creating 306 the access control list for each file which is uploaded. The access control list can initially indicate that the user is the owner of the content and the sole user authorized to access that content. Additionally, any blocked content flag is initially clear. In one implementation, automatic processing can be used 308 to mark content as objectionable.

Figure 4:
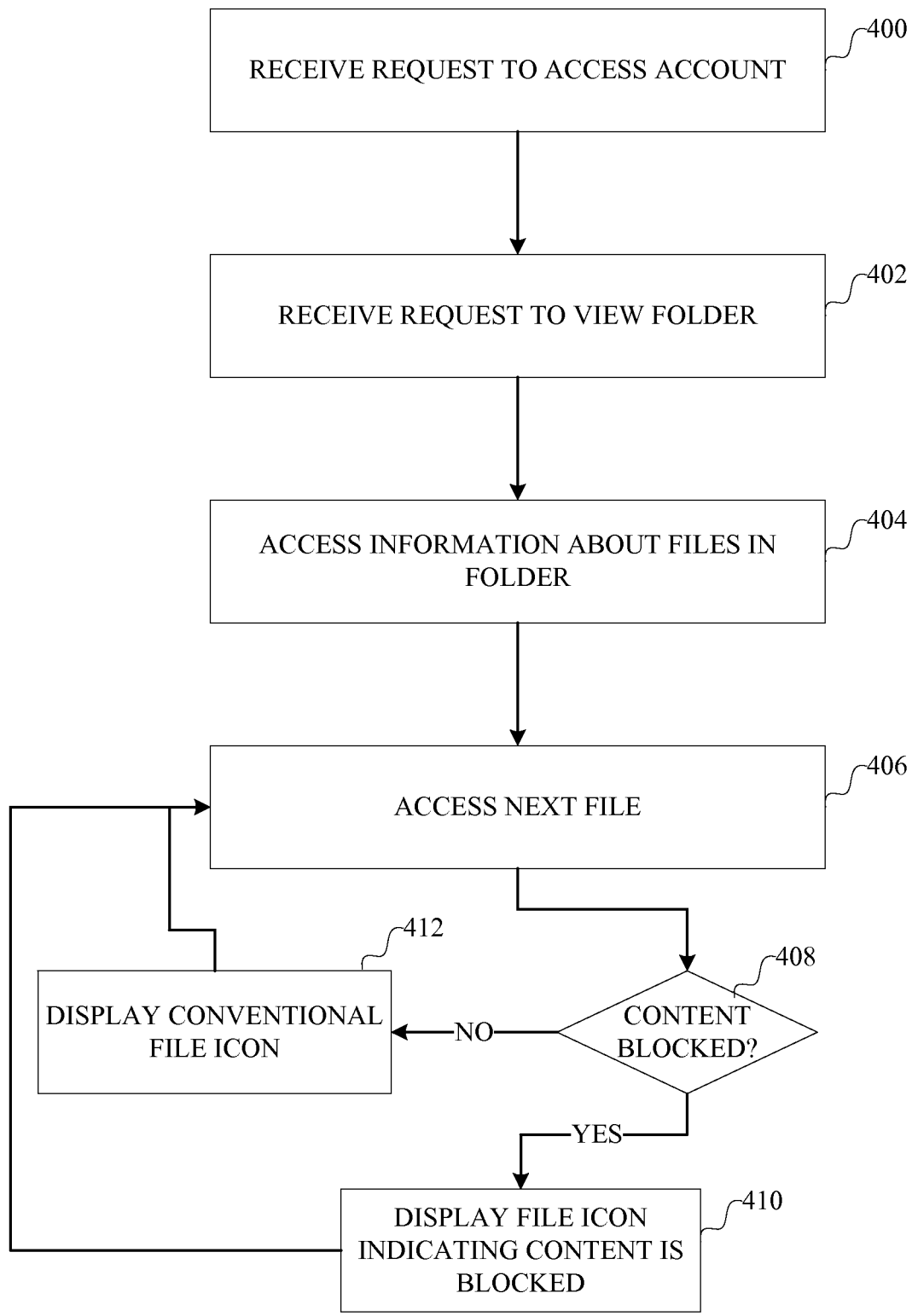
FIG. 4 is a flow chart an example implementation of accessing content on the storage system.

FIG. 4 is a flowchart describing an example implementation of operation of such a system when accessing content.

A system receives 400 a request form a user to access his or her account. After allowing access, the system can receive 402 a request from the user to view the contents of a selected folder. The system accesses 404 information about the contents of the selected folder. For each file, as indicated at 406, the system determines 408 whether the access to the file is authorized and whether access to content is blocked. If content is blocked, then an indication of the file, such as an icon, is displayed 410, with the icon indicating that access to the content is blocked. Otherwise, a conventional indication of the file is displayed 412.

Figure 5:
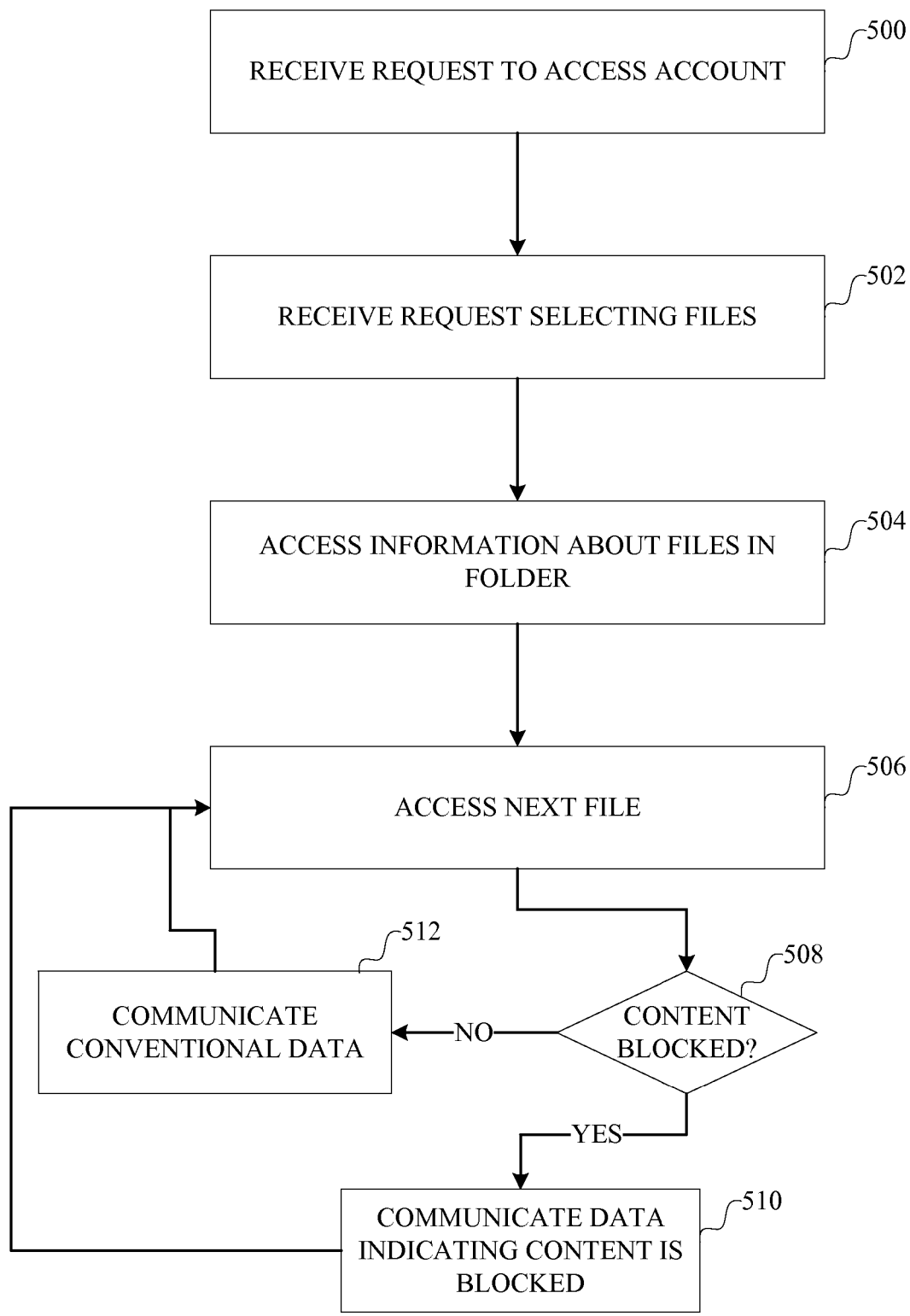
FIG. 5 is a flow chart an example implementation of sharing content on the storage system.

FIG. 5 is a flowchart describing an example implementation of operation of such a system when a user shares content.

A system receives 500 a request form a user to access his or her account. After allowing access, the system can receive 502 a request from the user identifying selected files to be shared. The system accesses 504 information about the selected files. For each file, as indicated at 506, the system determines 508 whether the access to the file is authorized and whether access to content is blocked. If content is blocked, then the information about the file that is communicated 510 to the other user includes data indicating that access to the content is blocked. Otherwise, a conventional information about the file is communicated 512.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
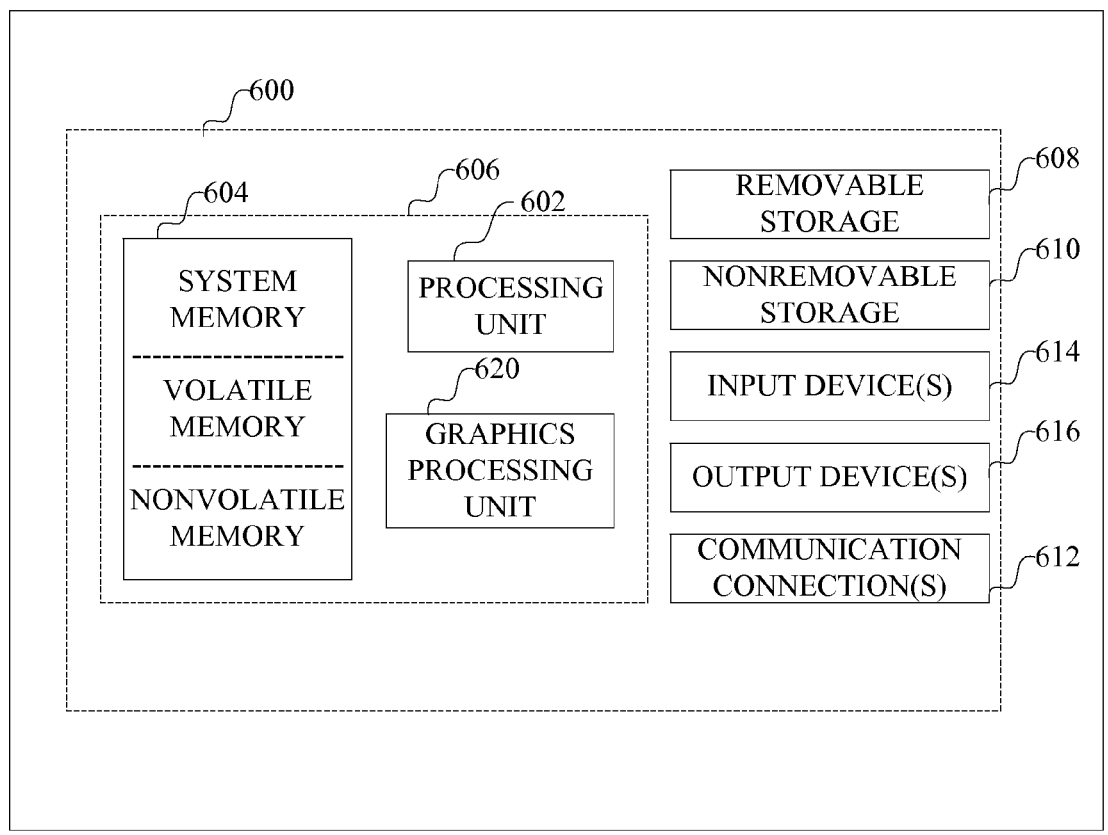
FIG. 6 is a block diagram of an example computer with which components of such a system can be implemented.

FIG. 6 illustrates an example of a suitable computer. This is only one example of a suitable computer and is not intended to suggest any limitation as to the scope of use or functionality of such a computer.

With reference to FIG. 6, an example computer 600, in a basic configuration, includes at least one processing unit 602 and memory 604. The computer may include multiple processing units and/or additional co-processing units such as graphics processing unit 620. Depending on the exact configuration and type of computer, memory 604 may be volatile (such as RAM), non-volatile (such as ROM, flash memory, etc.) or some combination of the two. This configuration is illustrated in FIG. 6 by dashed line 606.

Additionally, computer 600 may also have additional features/functionality. For example, computer 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 600. Any such computer storage media may be part of computer 600.

Computer 600 may also contain communications connection(s) 612 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 612 are devices that interface with the communication media to transmit data over and receive data from communication media, such as a network interface.

Computer 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Such computer instructions can be stored on a computer storage to provide an article of manufacture. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process, comprising:
maintaining a plurality of objects on computer storage of a storage system for use by a plurality of users, each user of the plurality of users having a user account with the storage system, wherein each object in the plurality of objects is a file and is associated with:
an owner user from among the plurality of users,
permissions for other users from among the plurality of users for accessing the object, and
an access control list for the object including data indicating whether the object is marked as containing objectionable content;
receiving indications of objects in the storage identified as including objectionable content, and setting the data of the indicated objects such that the indicated objects are marked as containing objectionable content;
receiving a plurality of requests from the plurality of users to access objects in the plurality of objects; and
in response to each request, in the plurality of received requests, to access an object of the plurality of objects from a user other than the owner user of the object:
authenticating the user associated with the request according to the permissions of the object;
determining whether the requested object is marked as containing objectionable content; and
in response to a determination that the object is marked as containing objectionable content and the user is authenticated to access the object, limiting access to the objectionable content from the requested object by the authenticated user by preventing access by the authenticated user to the objectionable content included in the stored object while allowing access by the authenticated user to metadata included in the stored object.

2. The computer-implemented process of claim 1, further comprising:
allowing a first user to share, with a second user, a group of the plurality objects, in the computer storage, which the first user is authorized to share;
determining if the group of objects includes an object that is marked as containing objectionable content;
limiting access by the second user to the objectionable content in the marked object, while allowing the second user to access other objects in the group of objects.

3. The computer-implemented process of claim 1, wherein limiting access includes preventing access to a file stream in the file containing the objectionable content.

4. The computer-implemented process of claim 1, wherein limiting access includes allowing access to a file stream in the file containing the metadata about the file.

5. The computer-implemented process of claim 1, wherein the object is a file storing an image and limiting access to content in the file includes preventing access to a reduced image representative of the image stored in the file.

6. The computer-implemented process of claim 1, further comprising:
   allowing a first user to share, with a second user, the object that is marked as containing objectionable content;
   limiting access by the second user to the objectionable content in the object.

7. The computer-implemented process of claim 1, further comprising:
   displaying to the user requesting the object an indication that the object is marked as including objectionable content.

8. An article of manufacture comprising:
   a computer storage, and computer program instructions stored on the computer storage, wherein the computer program instructions, when processed by a processing device, instruct the processing device to perform a process comprising:
   maintaining a plurality of objects on computer storage of a storage system for use by a plurality of users, each user of the plurality of users having a user account with the storage system, wherein each object in the plurality of objects is a file and is associated with:
      an owner user from among the plurality of users,
      permissions for other users from among the plurality of users for accessing the object, and
      an access control list for the object including data indicating whether the object is marked as containing objectionable content;
   receiving indications of objects in the storage identified as including objectionable content, and setting the data of the indicated objects such that the indicated objects are marked as containing objectionable content;
   receiving a plurality of requests from the plurality of users to access objects in the plurality of objects; and
   in response to each request, in the plurality of received requests, to access an object of the plurality of objects from a user other than the owner user of the object:
      authenticating the user associated with the request according to the permissions of the object;
      determining whether the requested object is marked as containing objectionable content; and
      in response to a determination that the object is marked as containing objectionable content and the user is authenticated to access the object, limiting access to the objectionable content from the requested object by the authenticated user by preventing access by the authenticated user to the objectionable content included in the stored object while allowing access by the authenticated user to metadata included in the stored object.

9. The article of manufacture of claim 8, wherein the process further comprises:
   allowing a first user to share, with a second user, a group of objects;
   determining if the group of objects includes an object that is marked as containing objectionable content;
   limiting access by the second user to the objectionable content in the object that is marked, while allowing the second user to access other objects in the group of objects.

10. The article of manufacture of claim 8, wherein limiting access includes preventing access to a file stream in the file containing the objectionable content.

11. The article of manufacture of claim 8, wherein limiting access includes allowing access to a file stream in the file containing metadata about the file.

12. The article of manufacture of claim 8, wherein the object is a file storing an image and limiting access to content in the file includes preventing access to a reduced image representative of the image stored in the file.

13. The article of manufacture of claim 8, wherein the process further comprises:
   allowing a first user to share, with a second user, the object that is marked as containing objectionable content;
   limiting access by the second user to the objectionable content in the object.

14. The article of manufacture of claim 8, wherein the process further comprises:
   displaying to the user requesting an object an indication that the object is marked as including objectionable content.

15. A computer storage system comprising:
   storage in which objects are stored containing content, for use by a plurality of users, each user of the plurality of users having a user account with the storage system, wherein each object in the plurality of objects is a file and is associated with:
      an owner user from among the plurality of users,
      permissions for other users from among the plurality of users for accessing the object, and
      an access control list for the object including data indicating whether the object is marked as containing objectionable content;
   a content blocking module, connected to the storage, having an input configured to receive indications of objects in the storage identified as including objectionable content, and having an output configured to set the data of the indicated objects such that the indicated objects are marked as containing objectionable content;
   one or more processors, connected to the storage, programmed to:
      receive a plurality of requests from the plurality of users to access objects in the plurality of objects; and
      in response to each request, in the plurality of received requests, to access an object of the plurality of objects on the storage from a user other than the owner user of the object:
         authenticate the user associated with the request according to the permissions of the object;
         determine whether the requested object is marked as containing objectionable content,
         in response to a determination that the object is marked as containing objectionable content, and the user is authenticated to access the object, limit access to the objectionable content included in the requested object by the authenticated user by preventing access by the authenticated user to the objectionable content included in the stored object while allowing access by the authenticated user to metadata included in the stored object.

16. The computer storage system of claim 15, the one or more processors being programmed to:

allow a first user to share, with a second user, a group of objects;

determining if the group of objects includes an object that is marked as containing objectionable content;

limiting access by the second user to the objectionable content in the object that is marked, while allowing the second user to access other objects in the group of objects.

17. The computer storage system of claim 15, further comprising one or more server computers, including the one or more processors, and connected to a computer network, wherein a plurality of users access the one or more server computers over the computer network to access objects stored on the storage.

18. The computer storage system of claim 15, the one or more processors being programmed to cause an indication to be displayed to the user requesting an object that the object being accessed includes objectionable content.

\* \* \* \* \*